United States Patent [19]

Rugheimer et al.

[11] 4,175,750

[45] Nov. 27, 1979

[54] HOLOGRAPHIC PUZZLE

[76] Inventors: Norman M. Rugheimer, Rte. 2, Box 350, Bozeman, Mont. 59715; Scott R. Chestnut, 5 Heatherwood La., Billings, Mont. 59102

[21] Appl. No.: 867,886

[22] Filed: Jan. 9, 1978

[51] Int. Cl.² ............................................. A63F 9/12
[52] U.S. Cl. .................................. 273/157 R; 350/3.85
[58] Field of Search .................... 273/157 R, 157 A; 350/3.66, 3.85

[56] References Cited

U.S. PATENT DOCUMENTS

| | | | |
|---|---|---|---|
| 2,634,132 | 4/1953 | Freedman | 273/148 A |
| 2,815,310 | 12/1957 | Anderson | 156/64 |
| 2,882,631 | 4/1959 | Boone | 40/130 |
| 3,515,452 | 6/1970 | Pole | 350/3.5 |
| 3,533,676 | 10/1970 | Lin | 350/3.66 |
| 3,538,632 | 11/1970 | Anderson | 40/106.51 |
| 3,547,510 | 12/1970 | De Bitetto | 350/3.66 |
| 3,588,115 | 6/1971 | Nichols | 273/157 A X |
| 3,692,312 | 9/1972 | Meyer | 273/157 R |
| 3,704,892 | 12/1972 | Moravick et al. | 273/157 R |
| 3,802,769 | 4/1974 | Rotz et al. | 352/43 |
| 3,810,687 | 5/1974 | De Lang et al. | 350/3.5 |
| 3,884,476 | 5/1975 | Sanders | 273/157 R |
| 3,937,565 | 2/1976 | Alasia | 350/320 |
| 3,942,861 | 3/1976 | George | 350/3.5 |

OTHER PUBLICATIONS

"White Light Holograms" by E. N. Leith, Scientific American, Oct. 1976, pp. 80–95.
"Optical Holography", Collier et al., Academy Press, New York, 1971, pp. 174–177.

*Primary Examiner*—Anton O. Oechsle
*Attorney, Agent, or Firm*—Fleit & Jacobson

[57] ABSTRACT

A multi-element puzzle is formed of segments of a hologram which has recorded thereon a holographic image of a scene or object. The puzzle pieces are formed of film and are arranged on an assembly stand which is illuminated by a specialized light source. Upon the player correctly orienting and arranging the puzzle pieces, the object or scene when viewed successively through the individual pieces will provide the viewer with a view which smoothly and continuously changes in perspective according to the relationship between the viewer and the location of the individual puzzle pieces. When viewed by the player, the object or scene may appear to be behind the film, i.e, a virtual image, or it may appear to be embedded in the plane of the puzzle pieces. In some cases, a portion of, or even the whole image may appear to be in front of the film. In another embodiment, a 360° hologram is used and the puzzle pieces are arranged on the exterior of a transparent cylinder. The correctly formed image appears as a virtual image inside the cylinder and a perspective is available completely surrounding the object.

16 Claims, 8 Drawing Figures

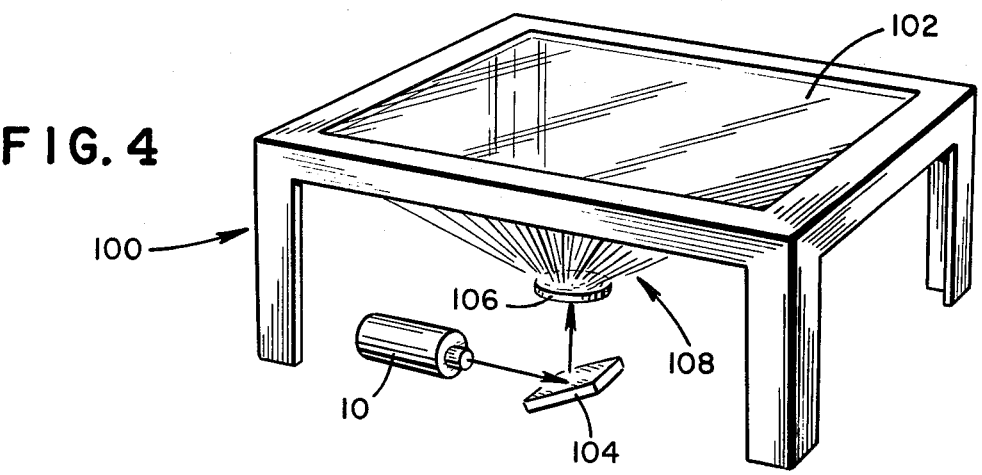
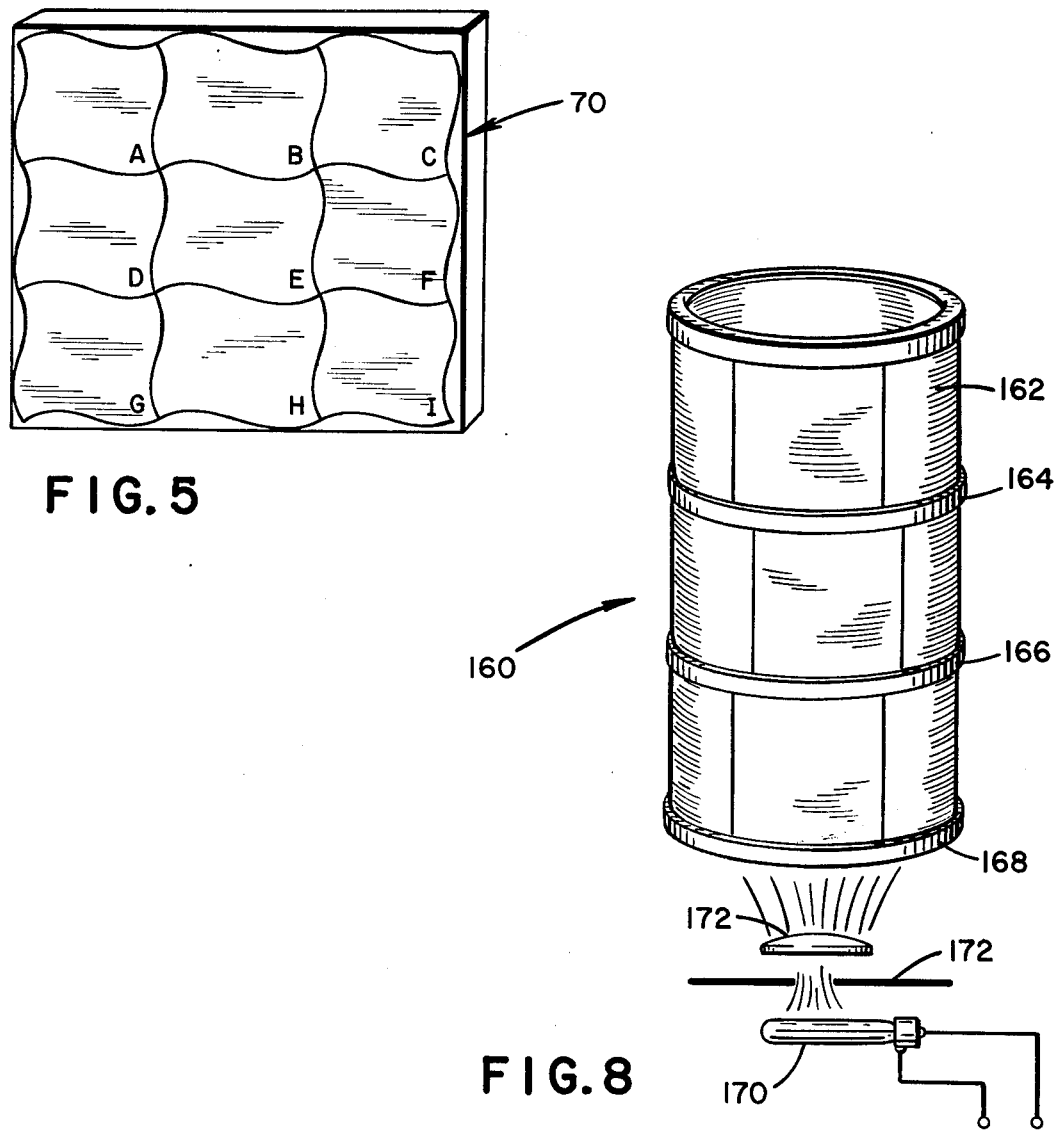

HOLOGRAPHIC PUZZLE

BACKGROUND OF THE INVENTION

The well-known picture puzzle, i.e., the jigsaw puzzle employing a large number of interlocking pieces has been well-known for a long period of time. Such puzzles reached the peak of their popularity in the United States during the 1930's and 40's, before the advent of television. Typically, these puzzles are created by beginning with a picture of a scene or an object or person and then cutting or stamping this single picture into a plurality of smaller interlocking pieces, whereby each of the individual pieces carries a small portion of the original scene. The pieces are constructed such that they will only fit together in one way and, by a process of deduction and trial and error, the original composite scene is then reconstructed from the individual pieces. This type of jigsaw puzzle may be as complex or as simple as desired, depending upon the number of pieces and the original picture to be reconstructed.

At the present time it appears that the conventional multi-piece jigsaw puzzle has been developed to its greatest extent and that no further improvements may be made in order to make the puzzle more complex. The more advanced picture puzzles may have a circular border, thereby eliminating the initial advantage of constructing the four corners of the puzzle. Also, some puzzles may have large areas of the same color or have a small pattern such that it becomes very difficult to determine the exact location of many of the pieces.

A branch of the physical sciences which is very far removed from the entertainment aspects of jigsaw puzzles has been undergoing increased development since it was first disclosed in 1947. This concept is holography, whereby three-dimensional images appear in space when viewed through a two-dimensional sheet of film. The technology surrounding holography has been steadily increasing since its discovery in 1947, and the discovery of the laser in 1960 has contributed greatly to the advance of holography.

Although the initial holograms were formed by the use of quasi-coherent light produced by a mercury arc lamp, currently the most popular technique for forming holograms uses coherent light. As the development of the laser was advanced, they became the ideal source for use with holograms, since lasers are a ready source of coherent light. However, the science of holography has advanced to the state where it has now been demonstrated that laser produced holograms may be illuminated for viewing solely by ordinary, incoherent light which is termed white light and, in this regard, see the article in the October, 1976 issue of "Scientific American" by E. N. Leith.

BRIEF SUMMARY OF THE INVENTION

The present invention provides a multiple piece puzzle which draws upon the technological area of holography and applies it to the conventional entertainment concept of the jigsaw puzzle. More specifically, the present invention provides a multi-piece puzzle wherein the scene or subject of the puzzle is not formed of small segments of a total scene but, rather, wherein each puzzle piece, when properly viewed, will provide a complete single image of the subject of the puzzle from a different angle of perspective. The inventive holographic puzzle is intended to be assembled on a specially provided light table apparatus. When viewing the properly assembled pieces on top of the illuminated light table, a single virtual image will appear. Moreover, when viewing the assembled puzzle from various angles, the perspective of the puzzle subject will change in a smooth and continuous fashion, just as if the viewer were actually changing his viewing perspective in relation to the object. The holographic image can be either real or virtual and in one embodiment of the present invention, actually a sort of combination of a real and virtual image may be present. In the event that the puzzle is incorrectly assembled, the perspective will not change properly in a smooth and continuous fashion but will appear in a disjointed and illogical sequence. For example, if the puzzle pieces are correctly assembled, when looking at the puzzle piece arranged in the upper left hand corner, the object will appear as if the viewer were properly situated so as to view the object from the upper left hand corner. As the viewer's eye moves to the pieces arranged in the lower right hand corner, the perspective will change sequentially in a smooth and orderly fashion, such that any change will be imperceptible to the eye. Upon arriving at the lower right hand corner piece, the viewer will see the object as if he were actually situated at an angle of perspective so that he would view at the lower right hand corner of the object. However, in the event that the inventive puzzle pieces are arranged incorrectly, and continuing with the sample example, then in making the transition along the diagonal to the lower right hand corner, a view of the object might be seen which will appear to be from the upper right hand corner, i.e., the perspective will be out of order, will not be continuous, and several distinct images of the entire scene will be noticed by the viewer. Therefore, the inventive puzzle is intended to be assembled such that when all of the pieces are arranged on the light table and are then viewed by the puzzle assembler, the perspective will be exactly as it is in reality and will proceed with a correct transition through all of the possible angles of perspective which could be assumed by the viewer.

When assembling the inventive puzzle, not only is the perspective transition required to be correct but also each of the individual pieces must first be aligned or oriented before any image is seen. Each individual puzzle piece may have eight separate orientations, i.e., the four sides of the front and back. Accordingly, the present inventive puzzle may be made highly complex or may be made less difficult, depending upon how much information is given as to the orientation of the individual puzzle pieces.

In another embodiment of the present invention, the 360° or circular holographic technique is employed. In this technique, the hologram is formed completely surrounding the subject and, upon viewing the hologram, if the viewer walks around the hologram, all sides of the subject can be seen. In this embodiment, the puzzle pieces are arranged on a surface of rotation, such as a right-circular cylinder, a cone, or similar shapes, which may be illuminated from the inside by a point source of white light. For example, upon correctly assembling the puzzle elements upon the surface of the transparent cylinder, the scene will appear inside the cylinder.

It is therefore an object of the present invention to provide a puzzle wherein each of a plurality of puzzle segments is formed of a portion of a hologram having a scene or object previously recorded thereon.

It is also an object of the present invention to provide a jigsaw puzzle wherein the individual pieces are formed of portions of a single holographic film sheet and wherein, when properly assembled on a light table, the image appears as a virtual image behind the plane of the puzzle.

It is another object of the present invention to provide a holographic puzzle wherein, upon properly assembling the puzzle elements upon an illuminating surface, the reproduced image appears to be embedded in the surface of the hologram, i.e., the image appears as partially real and partially virtual.

It is a further object of the present invention to provide a holographic puzzle in which, upon proper assembly of the puzzle pieces upon an appropriately illuminated surface, the recorded image may appear in front of the plane of the puzzle.

It is still another object of the present invention to provide a holographic puzzle wherein the puzzle elements are formed of portions of a 360° hologram and which are assembled upon the surface of a transparent cylinder.

The manner in which these and other objects are accomplished by the present invention will become more apparent from the following description of a preferred embodiment.

BRIEF DESCRIPTION OF THE DRAWINGS

FIG. 4 is a perspective view of a light table, suitable for illuminating the inventive holographic puzzle.

FIG. 5 is a perspective view of a hologram having been cut into the inventive holographic puzzle pieces.

FIG. 8 is a pictorial representation of the inventive holographic puzzle in the form of a 360° hologram.

DETAILED DESCRIPTION OF THE PREFERRED EMBODIMENT(S)

Figure 1:
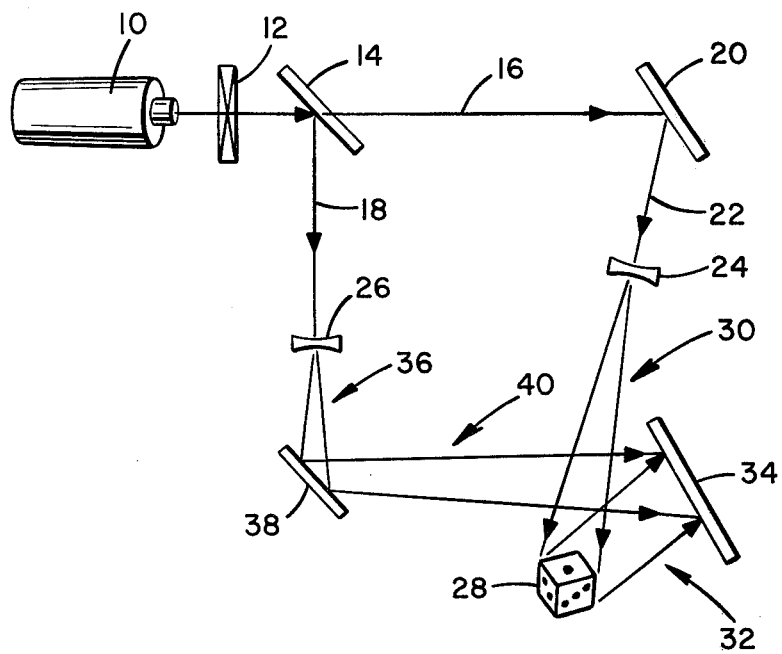
FIG. 1 is a schematic representation of a technique of producing a conventional holographic image on a sheet of film.

FIG. 1 shows a well-known arrangement, in schematic form, for producing a conventional hologram. A source of coherent light, which is typically a laser 10 provides a beam to a conventional photographic-type shutter 12 so that when the shutter is opened, the beam is passed to a conventional, optical beam splitter element 14. The beam splitter 14 then produces a first beam 16 which is to become the object beam and a second beam 18, which will become the reference beam. The object beam 16 is reflected by a mirror surface 20 and the reflected beam 22 is passed through a lens 24. Similarly, the reference beam 18 is passed through another lens 26. The object whose image is to be formed in the hologram is seen at 28 and, in this example, comprises a single die. The beam, shown typically at 30, which will illuminate the object is diverged by lens 24, so that it will illuminate the entire object 28 whose image is to be formed. Such light is reflected from the object 28 as represented by the two light beams, shown typically at 32, which then are incident upon a photographic plate or photographic film sheet 34. Simultaneously, with this illumination of the film 34 by beam 32, the other beam 36 having been produced by the lens 26, falls upon a mirror element 38 and is reflected as the reference beam 40, which also is incident upon the photographic sheet 34 at the exact location as the object beam 32.

Accordingly, the apparatus of FIG. 1 arranged in the conventional manner shows that in a typical hologram, coherent light from a laser 10 is split into two light beams 16, 18 wherein one light beam is caused to fall upon a photographic plate 34 and the other light beam 30 is caused to fall upon an object 28. The light beam falling upon the object is subsequently reflected by the object onto the photographic plate at the same location as the reference beams. In this manner, the reference beam 40 and the object beam 32 combine on the surface of the photographic plate to form a complex interference pattern.

The hologram, that is to become the plurality of inventive puzzle elements, may be formed as the hologram was formed in FIG. 1 on photographic film 34. It has been found in the present invention that a high-resolution, fine grain, photographic film may be used as the medium for the inventive holographic puzzle. Such film may be EK 649-F or SO 243 photographic film, both produced by the Eastman Kodak Company, Rochester, NY. Such films must be developed using a high resolution developing process and typical developers suitable for use are either D-19 or HRP developer, which are also manufactured by the Eastman Kodak Company. Additionally, while the above-mentioned films are very suitable for use in the present invention, similar high-resolution emulsions may be coated onto glass plates or onto a thicker base than the typical film base which is generally polyethelene terephthalate, and which is only 2—4 mils thick. Also, these fine grain emulsions may be coated onto thicker plates formed of either glass or plexiglas, which then can be formed into the plurality of holographic puzzle pieces. The present invention can be used to form a puzzle of any object or scene which would then be located as the die 28 in FIG. 1. Additionally, the present invention also contemplates that a hologram of a holographic image may be formed, in which case, in place of the actual object 28 a holographic image of some other object would be caused to be formed at that location. This will be seen in more detail in FIG. 3.

Figure 2:
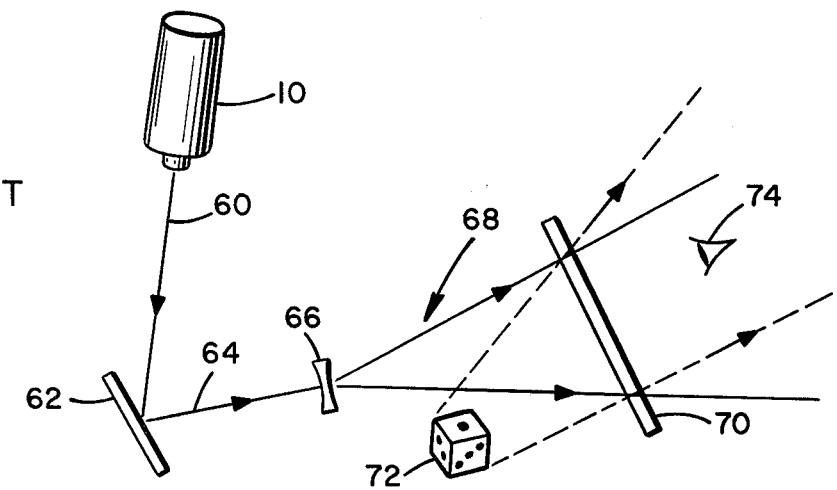
FIG. 2 is a schematic representation of a technique for illuminating holograms which produces a virtual image.

FIG. 2 shows the manner in which a conventional hologram, such as that produced at 34 in FIG. 1, may be illuminated and viewed. Once again a source of coherent light or a laser 10 produces the illumination beam 60 which impinges on a mirror surface 62, forming illumination reference beam 64. Of course, the mirror 62 is not essential, since the image may be formed by simply shining the laser beam onto the hologram. However, for the purposes of this exemplary embodiment, a mirror will be used to direct the laser beam onto the hologram. This beam 64 is fed once again to an objective lens 66 which then causes the coherent light beam 64 to be spread into beams, shown typically at 68, and to fall onto hologram 70, which corresponds to the hologram 34 but which has now been developed. Developing the film, as mentioned above, produces the interference pattern which had been previously recorded thereon by the object beam and the reference beam. Accordingly, putting the reference beam back onto the developed hologram 70 will cause the subject, shown at 28 in FIG. 1, to appear as a virtual image at location 72. The hologram 70 must be oriented with respect to the illumination beam 68, exactly the same as it was with respect to the reference beam 40 in FIG. 1. This virtual image is viewed by the eye of the viewer, shown diagrammatically at 74. It should be understood that it is the hologram 70 which is formed into the individual puzzle pieces of the inventive holographic puzzle.

Figure 3:
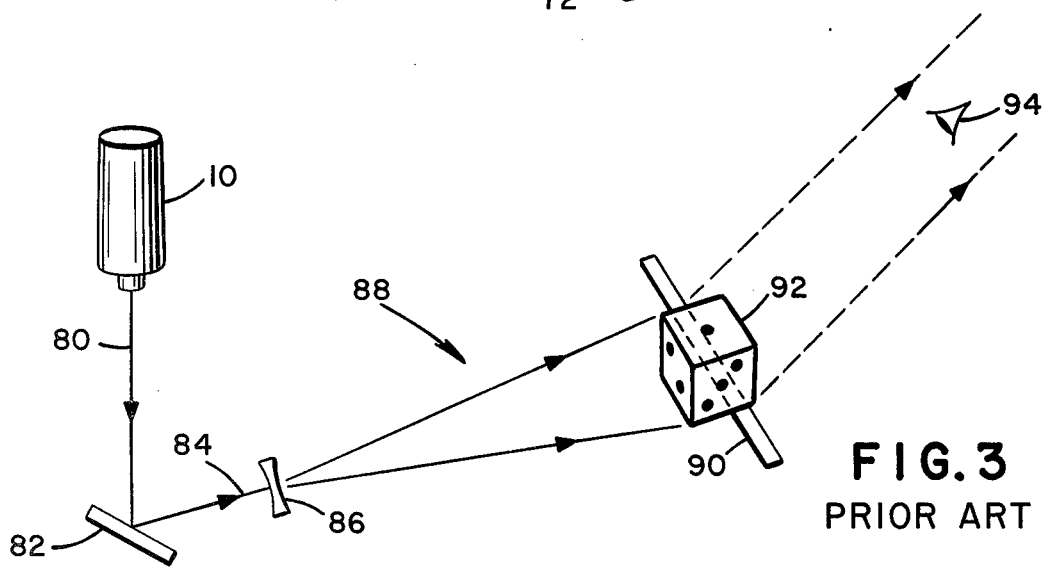
FIG. 3 is a schematic representation of a technique for illuminating a hologram which produces a partially real and partially virtual image.

FIG. 3 shows another type of hologram wherein the image appears to be embedded in the surface of the holographic sheet. Once again, a coherent light source or laser 10 is utilized to provide an illumination beam 80 which falls upon, and is reflected by a mirror element 82 forming the illumination beam 84 directed to another objective lens 86. As mentioned in regard to FIG. 2, the mirror element 82 is not necessary, since the laser beam may be shined directly onto the hologram to produce the image. The lens 86 then forms the illumination beam, shown typically at 88, which falls upon the developed photographic plate 90 bearing the holographic interference pattern. In this manner the developed interference pattern on sheet 90 is illuminated by the beam 88, corresponding to the original reference beam, and the object, shown diagrammatically at 92, appears to the observer 94 as being embedded in the plane of the holographic film sheet 90. As discussed above, this type of image is formed by using a holographically reproduced image as the subject of a second hologram. It is this second hologram which is shown at 92 in FIG. 3.

FIG. 4 shows an illumination table suitable for use in assembling one embodiment of the holographic puzzle of the present invention. More specifically, a conventional four-legged table, shown typically at 100, is provided and the top has a portion removed therefrom and a transparent glass or plexiglass insert 102 is arranged therein. The source of illumination is once again a laser 10 which produces an illumination beam which is reflected by mirror element 104 and is then caused to be dispersed by an objective lens 106 into a relatively broad beam 108, which illuminates the underside of the transparent surface 102. Although the mirror 104 is not necessary, it permits the table 100 to have a less bulky shape.

It is understood, of course, as mentioned above, that it is possible now to produce holographic images by the use of white light, thereby eliminating the need for the laser and permitting only a point source of non-coherent light to be used. A suitable white light source has been found to be a conventional tungsten filament bulb having a clear glass envelope. In that event, the laser and mirror assembly could be replaced by the white light source. It should be repeated again that holographic images must be reproduced by an illumination source which strikes the developed photographic emulsion at the identical angle with which the reference beam struck the emulsion when the hologram was produced.

In regard to the use of white light as an illumination source, it is noted that all white light sources produce incoherent light composed of all wavelengths in the visible electromagnetic spectrum. Whereas, a laser only produces a narrow band of frequencies, a large percentage of the laser output is both time and spatially coherent light.

The table in FIG. 4 is then used by the puzzle assembler or player to assemble the pieces of the inventive holographic puzzle upon the surface 102. The manner of assembly of the puzzle will be discussed in detail hereinbelow.

Referring now to FIG. 5, hologram 70, which was produced by the apparatus shown in FIG. 1 and which when properly illuminated and viewed will produce a virtual image, see FIG. 2, is shown having been cut into nine pieces, A through I, which correspond roughly to the pieces of a jigsaw puzzle. Each of the nine pieces in the present embodiment is formed into a seemingly irregular shape; however, each piece may be formed in a shape identical to all other pieces. In other words, in the present embodiment what has been produced from the hologram 70, formed by the apparatus of FIG. 1, is now nine individual segments, each of which has the identical shape. If the hologram 70 of FIG. 2 were cut into pieces which were shaped like those normally associated with a jigsaw puzzle, then a feature of this embodiment of the present invention would be changed, in that the requirement to look at the transition of perspective associated with the correct assembly of the various pieces, would be altered. It should be understood, however, that although an interlocking holographic puzzle has not been shown, such puzzle is entirely feasible according to the present invention. In such interlocking puzzle, it would be exceedingly difficult to try to find the proper orientation from which to view an irregularly shaped interlocking puzzle piece, prior to finding its correct location in the puzzle.

In the embodiment shown in FIG. 5, although the pieces A-I are shown having an irregular outline, the inventive holographic puzzle does not require the pieces to be shaped in anything other than an ordinary rectangle. However, in keeping with the conventional public concept of a puzzle, it is advantageous to provide some degree of fitting or locking together, even though all of the pieces may fit together in the same manner. It is noted that none of the subject, originally recorded on the hologram, will be lost by the trimming of the portion corresponding to the selvage when forming the puzzle pieces as in FIG. 5.

Figure 6:
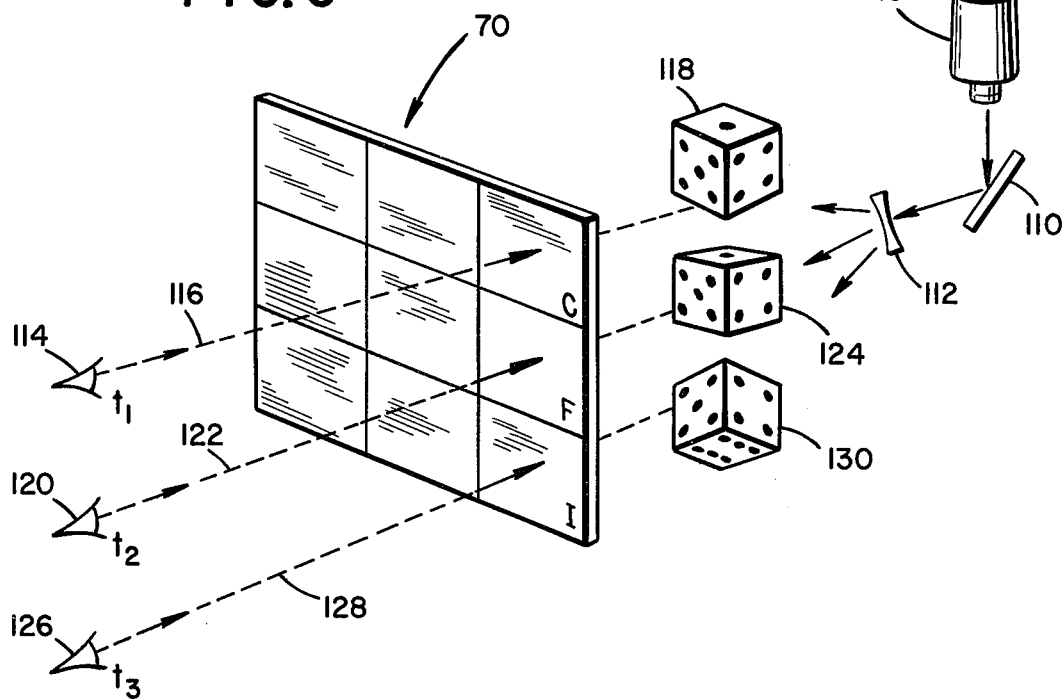
FIG. 6 is a schematic representation of a viewer viewing the inventive holographic puzzle which has been correctly assembled.

Turning now to FIG. 6, the hologram as might have been produced by the apparatus in FIG. 2, is shown having been divided into the segments A-I forming the puzzle pieces. In this case, the puzzle segments have not been formed having abstractly formed edges but rather are shaped as rectangles. However, for the purpose of the example of FIG. 6, the letter labels associated with the nine pieces in FIG. 5 will be retained. Additionally, it should be understood that the puzzle is actually being assembled on a table, such as that shown in FIG. 4, and that once again a suitable illumination source must be utilized. In the example of FIG. 6, once again a laser 10 is utilized, in conjunction with a reflecting mirror element 110 and an objective lens element 112, to produce a beam for illuminating the surface of the hologram through the transparent table surface, 102 of FIG. 4. Once again, although not necessary, the mirror is convenient since it allows the laser to be arranged horizontally below the table.

It is assumed that the puzzle pieces have been placed upon the light table in the correct orientation so as to produce an image and also have been arranged in what is thought to be the correct order. This has been checked or tested during the assembly of the puzzle since, in the first instance, if the puzzle piece is incorrectly oriented as to up-down or front-back, then no image, or a psuedoscopically inverted image (which may present quite a challenge to the puzzle assembler), will appear to the player when viewing through that puzzle piece. This is because the orientation of each piece must be identical to its orientation when the hologram was initially formed. Assuming then that all of the pieces have been correctly oriented, or at least pieces C, F, and I have been correctly oriented so that an image is formed, the puzzle will still not be correctly assembled unless the perspectives blend in a smooth transition. In other words, when looking down at the top of image of the die formed in the hologram 70, the top surface bearing the representation of numeral one should be seen, and when looking up from the bottom of the hologram, the opposite face of the die bearing the representation of the numeral six should be seen. Accordingly, when viewing at a first time $t_1$, and peering from the vantage point, shown schematically at 114, through the upper right hand element C, the portion of the image of the die will be seen from the top right perspective and the representation of the numeral one at the top will be seen as well as the front face bearing the representation of the numeral five and the right face bearing the representation of the numeral four. This visual representation at time $t_1$ is seen when peering along the line of sight 116 and the image is represented at 118. Similarly, at some later time $t_2$ when peering through the segment F of the assembled hologram, which is the right-center segment, the holographic image of the die will be seen almost entirely head-on from the right side and depending upon the slight degree of disorientation, some part of the top or bottom may also be seen. However, the two sides will be seen almost in equal perspective, i.e., the side bearing the representation for the numeral five and the side bearing the representation of the numeral four will appear of equal size. This image is seen when peering along the dashed line of sight 122 and the image is represented at 124. Once again, if the three right hand puzzle pieces have been assembled in the C-F-I sequence, reading from top to bottom, then when looking at some later time $t_3$ from the voltage point pictorially represented at 126 and peering along line of sight 128 through puzzle segment I, the holographic image 130 will be seen. Once again, since element I represents the view of the original die, as imaged on hologram 70, from the lower right hand corner then the bottom surface of the die bearing the representation for numeral six will be seen, as well as the two right hand sides bearing the representation from the numerals five and four, respectively. It should be understood that, when viewing the assembled hologram, only one image is seen and, moreover, when viewing through three segments located along the right hand side, i.e., C, F, I, and in the sequence $t_1$, $t_2$, $t_3$, an orderly and continuous transition will be seen from one angle of perspective to the next. Also, in regard to FIG. 6, six of the other segments of the puzzle have not been shown and in this regard, unless actually looking through such pieces in a changing perspective sequence, it is not possible from the above discussion and FIG. 6 to determine if these puzzle pieces have been correctly oriented or arranged.

Figure 7:
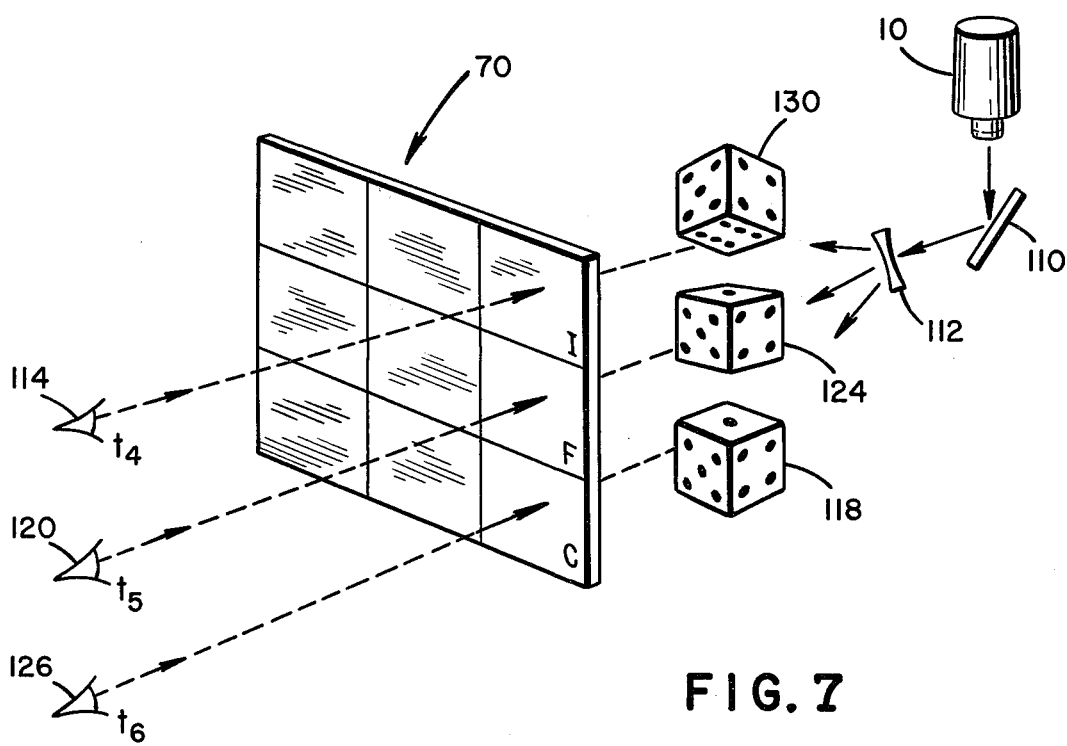
FIG. 7 is a schematic representation of a viewer viewing the inventive holographic puzzle which has been incorrectly assembled.

Referring now to FIG. 7, the hologram 70 as formed in FIG. 2 is shown once again having been cut into the same nine rectangular segments, A through I. However, in FIG. 7 they have not been arranged in the correct perspective arrangement and, as may be seen, the segment which should be in the lower right hand corner is now positioned in the upper right hand corner, i.e., segment C and segment I have been interchanged. The same illumination system utilizing a coherent light source 10, mirror 110, and objective lens 112 has also been employed. Accordingly, when viewing from the vantage point 114 at some time $t_4$, the viewer will observe the lower surface of the die at 130 bearing the representation for the numeral six. This, of course, is physically impossible since the actual angle of perspective of the viewing point should produce a view looking down upon the top of the die and seeing the single dot representing the numeral one. Moving downward along the right hand column in a vertical direction, the hologram segment F is viewed from the vantage point 120 at time $t_5$, and the image appears at 124 exactly as it did in FIG. 6, wherein the puzzle pieces were assembled in the correct sequence. Similarly, when viewing the puzzle segment C from the vantage 126 the viewer will see the top surface of the die as represented in image 118, where actually the bottom surface of the die should be seen. Therefore, assuming that all of the other puzzle pieces have been arranged correctly and when viewing through each puzzle piece in the normal sequence, it will be indicated to the puzzle assembler or player that the puzzle has been incorrectly assembled and that at least two of the nine elements have been misplaced.

FIG. 8 is another embodiment of the inventive holographic puzzle, wherein in place of the conventional flat sheet hologram the hologram is initially formed as a 360° hologram. These holograms often can be viewed by white light which illuminates the inside of the 360° hologram and the viewer sees the image on the inside of the cylindrical hologram. Such 360° holograms are typically formed as a right circular cylinder with the image appearing on the inside of the cylinder. As mentioned above, such 360° holograms are formed by wrapping the film around the object whose image is desired to be holographically reproduced. Accordingly, upon illumination of the interior of the cylindrical hologram by a suitable reference illuminating light, it is possible to see all sides of the object by walking around the circular hologram. Referring then to FIG. 8, a circular hologram is utilized as the inventive holographic puzzle by taking a 360° hologram and cutting it into an appropriate number of pieces. The present invention provides a right-circular cylinder 160 formed of a transparent plastic such as Plexiglas or Lucite. The 360° hologram is cut into a plurality of segments or puzzle pieces, which must then be reassembled to form the holographic image inside the right-circular, transparent cylinder 160. A typical inventive holographic puzzle segment is shown at 162 and this embodiment is shown having a rectangular shape although, it should be understood, that the puzzle segments may also have abstractly formed exterior edges, such as shown in FIG. 5. In order to afix the puzzle segments 162 on the clear cylinder 160, circumferential channels 164, 166, 168 are attached to the cylinder 160. These channels 164, 166, 168 then permit the puzzle segments to be inserted therein so as to retain them against the cylinder. In an alternate embodiment, the present invention contemplates the use of a relatively light coating of adhesive, which may be applied to the surface of the transparent cylinder 160, so that the film pieces 162 may be affixed thereto. Alternately, the film pieces and the cylinder may be caused to remain in contact by the use of the well-known Velcro fastening strips.

As discussed above, the 360° hologram may be viewed either by a laser or by means of a non-coherent white light. A convenient source of white light may be a tungsten bulb having a clear envelope 170. As mentioned, the source of white light must be essentially a point source, or in some cases a line source, and the light produced by the tungsten filament bulb having a clear envelope 170 is satisfactory. Once again, not only the orientation of each individual film segment 162 must be determined, i.e., up-down/front-back, but also the location of the individual film segment must be correctly determined to successfully assemble the puzzle so that the perspective changes in a smooth and continuous pattern.

It should be understood, that the above-description of the preferred embodiment has been given by way of example only and the inventive holographic puzzle may take various forms. For example, the puzzle may be formed having a very large number of pieces, with there being a lower limit of approximately of one-quater inch square. Similarly, many types of work tables or light assembly tables may be utilized to assemble the puzzles.

Furthermore, the inventive holographic puzzle may be adapted for use with the well-known moving picture holograms, wherein upon relative motion between the viewer and the illuminated hologram, the image appears to move. Typically, such motion is accomplished by the viewer walking past the film and looking into and through the holographic window. A famous moving hologram is entitled "The Kiss" and consists of a young woman apparently winking and blowing a kiss to the observer. The present invention also contemplates that such motion picture holograms may also become the subject of holographic puzzles in that the pieces of the film representing the specific scene, need only to be cut into segments and then ultimately rearranged to form once again the sequential frames for producing a moving hologram.

It should be understood, of course, that the foregoing description has been given by way of example only and that the inventive holographic puzzle may take forms differing from those shown. For example, the pieces may take various shapes and many different objects and scenes may be the subject of the hologram. The present invention is intended to be limited only by the following claims.

What is claimed is:

1. Puzzle apparatus, intended to be assembled by at least one player, said puzzle apparatus comprising:
    a plurality of individual segments formed of a developed hologram having thereon an interference pattern of a subject, each of said individual segments being of a size so that the unaided eye can discern a complete holographic image of said subject with no degradation;
    a support surface; and
    an illumination means associated with said support surface and arranged such that the angle of illumination is identical to the angle of the reference beam used to form said developed hologram, whereby the player arranges and orients said individual segments on said support surface so that upon illumination by said illumination means said subject is visually holographically reproduced to said player.

2. The puzzle apparatus of claim 1 wherein said developed hologram is formed in a flat sheet.

3. The puzzle apparatus of claim 2 wherein each of said plurality of individual segments of said developed hologram is formed having identical geometrical shapes.

4. The puzzle apparatus of claim 2 wherein each of said plurality of individual segments of said developed hologram is formed such that the segments have differing configurations and are interlocking.

5. The apparatus of claim 1 wherein said developed hologram is substantially in the form of a cylindrical shape and comprises a 360° hologram.

6. The apparatus of claim 5 wherein said support surface is formed of a transparent cylinder.

7. The apparatus of claim 6 further including means associated with said cylinder for causing said plurality of individual segments to adhere to said cylinder.

8. The apparatus of claim 6 wherein said means is an adhesive coating applied to said cylinder.

9. The apparatus of claim 6 wherein said means is a plurality of circumferential channels affixed to said cylinder for receiving said pieces.

10. The apparatus of claim 6 wherein said illumination is a source of white light.

11. A game apparatus of the jigsaw puzzle type for assembly by at least one player, said game apparatus comprising:
    a plurality of puzzle pieces each having a predetermined geometrical shape and being formed from a single developed flat sheet hologram bearing a holographic image of a subject, each of said puzzle pieces being of a size so that the unaided eye can discern a complete holographic image of said subject with no degradation;
    an assembly surface whereon said player may assemble said puzzle; and
    illumination means for illuminating said assembly surface arranged at an angle substantially identical to the angle of the reference beam used to form said developed hologram, whereby said player orients and arranges said pieces in abutting relation one to another such that the proper perspective of said subject is visually evident to the player when viewed from differing angles of perspective.

12. The apparatus of claim 11 wherein said predetermined geometrical shape is such that all pieces have an identical geometrical shape.

13. The apparatus of claim 11 wherein said predetermined geometrical shape is such that the pieces have differing outline configurations and are interlocking.

14. A game apparatus of the jigsaw puzzle type for assembly by at least one player, said game apparatus comprising:
    a plurality of puzzle pieces each having a predetermined geometrical shape and being formed from a single developed 360° hologram bearing a holographic image of a subject;
    an assembly surface whereon said player assembles said puzzle pieces;
    illumination means for illuminating said support surface at an angle substantially equal to the angle of illumination of the reference beam used to form said developed 360° hologram; and
    means associated with said assembly surface for retaining said puzzle pieces on assembly surface such that upon orienting and arranging said pieces by said at least one player in abutting relationship on said assembly surface, a holographic image of said subject will appear to said player upon illumination by said illumination means.

15. A method for making a game apparatus, comprising the steps of:
   providing a hologram bearing a developed interference pattern of a subject;
   dividing said hologram into a plurality of pieces, each of said pieces being of a size so that the unaided eye can discern a complete holographic image of said subject with no degradation;
   forming the pieces such that each piece has the same geometrical shape;
   providing a transparent assembly surface; and
   illuminating said assembly surface at an angle substantially equal to the angle of the reference beam used to produce said hologram, whereby a player assembles said pieces upon said illuminated playing surface.

16. A method for making a game apparatus, comprising the steps of:
   providing a hologram bearing a developed interference pattern of a subject;
   dividing said hologram into a plurality of pieces;
   forming the pieces such that each piece has a shape which interlocks with its continguous pieces;
   providing a transparent assembly surface; and
   illuminating said assembly surface at an angle substantially equal to the angle of the reference beam used to produce said hologram, whereby a player assembles said pieces upon said illuminated playing surface.

* * * * *